United States Patent
Nagano et al.

(10) Patent No.: US 6,388,765 B1
(45) Date of Patent: May 14, 2002

(54) PAGE ALIGNMENT INDICATION METHOD, PAGE CONTROL METHOD, PRINTER SYSTEM AND PRINTER DEVICE

(75) Inventors: Noriko Nagano; Hiromitsu Nishimura; Takaji Fujiwara; Yoshikazu Ohnishi; Nobuko Fujiwara, all of Kato-gun (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/042,844

(22) Filed: Mar. 17, 1998

(30) Foreign Application Priority Data

Aug. 28, 1997 (JP) ............................................. 9-232913

(51) Int. Cl.$^7$ ............................ G06F 15/00; G06K 1/00; H04N 1/41
(52) U.S. Cl. ...................... 358/1.18; 358/1.17; 358/431; 707/523; 707/524; 707/525
(58) Field of Search .............................. 358/1.18, 1.17, 358/431; 707/525, 523, 524, 521

(56) References Cited

U.S. PATENT DOCUMENTS 5,519,867 A * 5/1996 Moeller et al. ............. 709/107
5,881,064 A * 3/1999 Lin et al. .................... 358/431

FOREIGN PATENT DOCUMENTS

| JP | 60-124728 | * 7/1985 | ............. G06F/3/12 |
| JP | 1-229325 | * 9/1989 | ............. G06F/9/06 |
| JP | 3-139719 | * 6/1991 | ............. G06F/9/06 |

* cited by examiner

Primary Examiner—Edward Coles
Assistant Examiner—Twyler Lamb
(74) Attorney, Agent, or Firm—Armstrong, Westerman & Hattori, LLP (57) ABSTRACT

On the side of a microcomputer for creating image data, a unique code for showing the page alignment is added to the created image data, and on the printer device side, the unique code is detected independently from the ordinary data analysis. The unique code is constituted by a sequence of a predetermined number or more of identical data of one or more bytes. Based on the results of detection of the unique code, page control and recovery process are executed.

18 Claims, 12 Drawing Sheets

PAGE ALIGNMENT INDICATION METHOD, PAGE CONTROL METHOD, PRINTER SYSTEM AND PRINTER DEVICE

BACKGROUND OF THE INVENTION

1. Field of the Invention

The present invention relates to a page alignment indication method and page control method in transferring the data from a data creation device to a printer device and printing, along with the printer system and printer device utilizing said page executive method.

2. Description of the Prior Art

In various business places, offices and the like, the printer systems are used in which a plurality of personal computers and a printer are connected by communication lines such as LAN, and the data obtained by the personal computers as the data creation device are transferred to the printer and printed. In such a printer system, in order to carry out page alignment process (process to renew page in corrective manner in printing), recovery process (process to carry out reinstatement and recovery of the data when any abnormality in printing has occurred), and the like, it is necessary to carry out page control over the data transferred from the personal computer (data creation device). And, heretofore, for this page control, a page alignment code to be incorporated in the transfer data is utilized. Concretely, the page alignment code "OC" which shows a page break is added to the last part of the data for one page.

In reading this page alignment code, it is necessary to carry out sequentially from the start of the data the process to refer to the code, confirm the length, and read the data (or skip the data by the portion of length). Accordingly, in order to recognize the page alignment code by searching, it is necessary to carry out data analysis from the first part, which means to search for the page alignment code even in the case such as image data having enormous amount of data while carrying out data analysis byte by byte, thus requiring a long period of time.

BRIEF SUMMARY OF THE INVENTION

An object of the present invention is to provide a page alignment indication method which can recognize the page alignment in a short time without carrying out data analysis.

Another object of the present invention is to provide a page control method with which the page control can be carried out quite quickly.

A further object of the present invention is to provide a printer system and a printer device with which recovery process can be performed quickly and correctly.

According to the invention, on the data creation device side, in order to show the page alignment, a page alignment code (unique code) comprising a sequence of a predetermined number or more of identical data of one or more bytes is inserted, and on the printer device side, the unique code is detected independently from the ordinary data analysis. As the unique code in the present invention shows the constitution in which one or plural bytes of identical data are arranged in sequence, the unique code can be easily detected without executing the data analysis as hitherto, and the page alignment command from the data creation device can be recognized in a short time.

And, control of the print control including the recovery process for each page is carried out according to the page alignment command thus recognized. Consequently, it is possible to carry out the control of this kind at a higher speed.

The above and further objects and features of the invention will more fully be apparent from the following detailed description with accompanying drawings.

DETAILED DESCRIPTION OF THE INVENTION

Hereinafter, the present invention is concretely explained with reference to the drawings showing the embodiments thereof.

Figure 1:
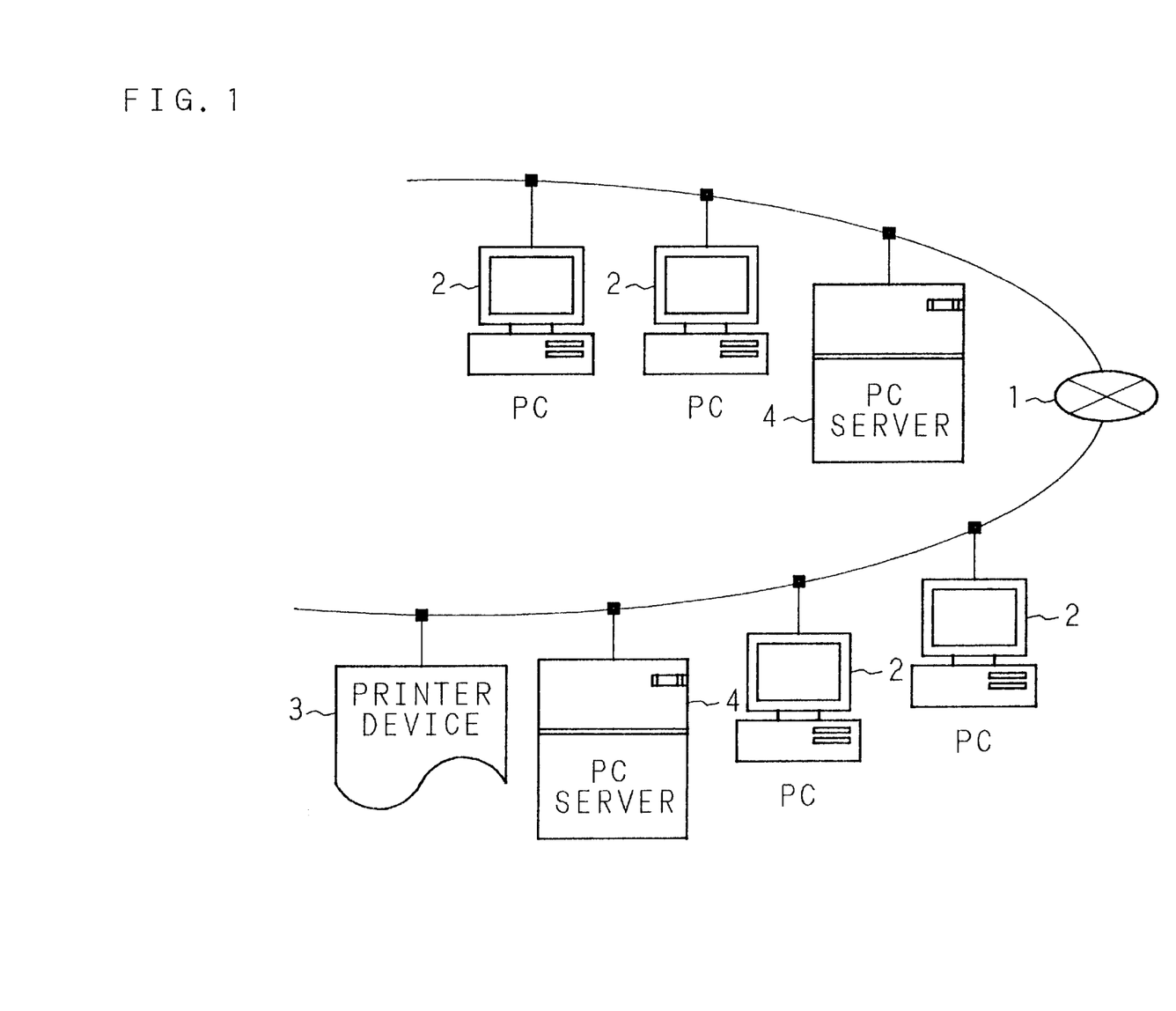
FIG. 1 is a block diagram of a printer system according to the present invention.

FIG. 1 is a block diagram of the printer system according to the present invention. In FIG. 1, the reference numeral 1 is for example LAN which is disposed in an office such as business office or business station. LAN 1 is connected with personal computers 2 as a data creation device for creating image data, a printer device 3 for printing the image data prepared by each personal computer 2, and a PC server 4 for providing information to each personal computer 2.

The personal computer 2 prepares the data on the display as the image data according to the user's input. When it recognizes the page alignment, it inserts the page alignment code, i.e., unique code to show the break of the page, into the position after the image data and before the page alignment code which is similar to that described in the above.

Figure 2:
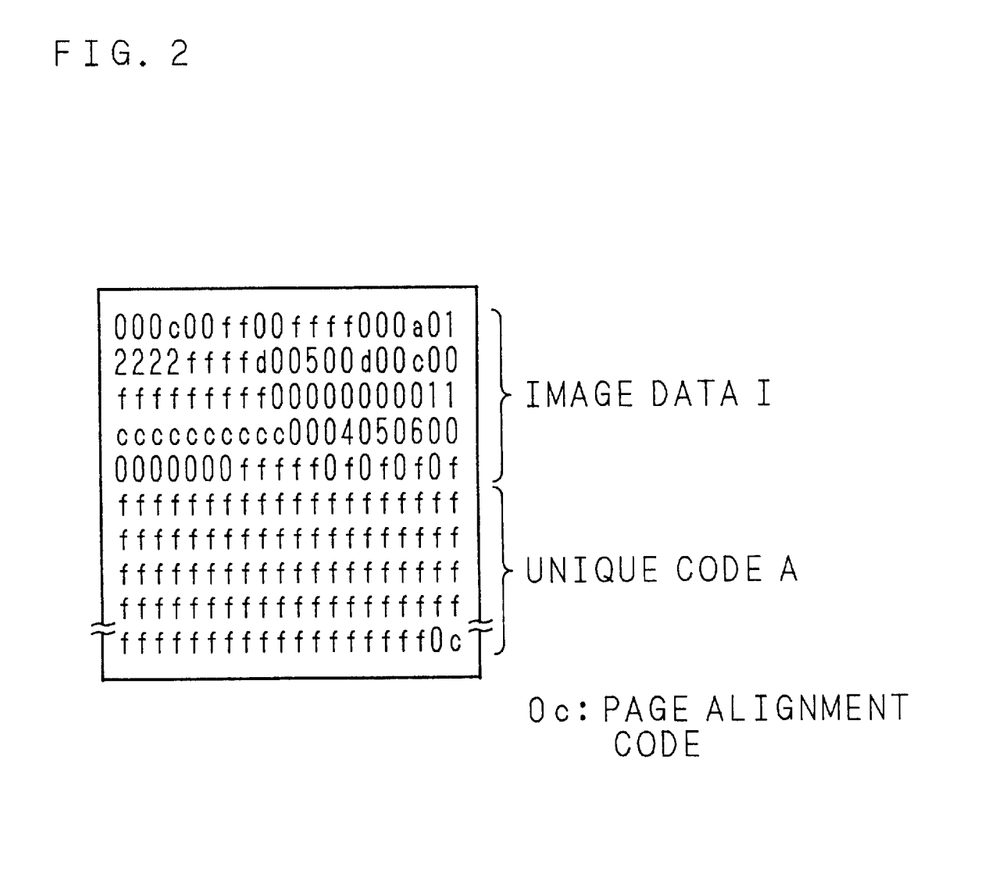
FIG. 2 is a view to show an example of insertion of a unique code in the present invention.

FIG. 2 is a view to show an example of insertion of the unique code as above, wherein, following the image data I which shows the data for one page portion, a unique code A formed by sequencing more than the predetermined number of bytes (about several thousand bytes) of data "ff" is inserted. After the unique code A, a page alignment code "0c" similar to the conventional one is provided. The unique code A is constituted by continuing a predetermined number or more of the same kind of data comprising one or plural bytes. For the same kinds of data, optional kind ones (e.g., "10", "234", "a", etc.) may be used. The code of the kind which can never occur in the printer system used should be employed for the purpose.

When the page alignment is recognized, the image data to which said unique code has been added is transmitted to the printer device 3 from each personal computer 2 and printed out to the hard copy. And, with the printer device 3, the added unique code is detected, and according to the detection, the page alignment is executed. Based on the executed page alignment information, printing for each page and recovery process are carried out.

Next, the four concrete embodiments of the invention are explained below.

(First Embodiment)

Figure 3:
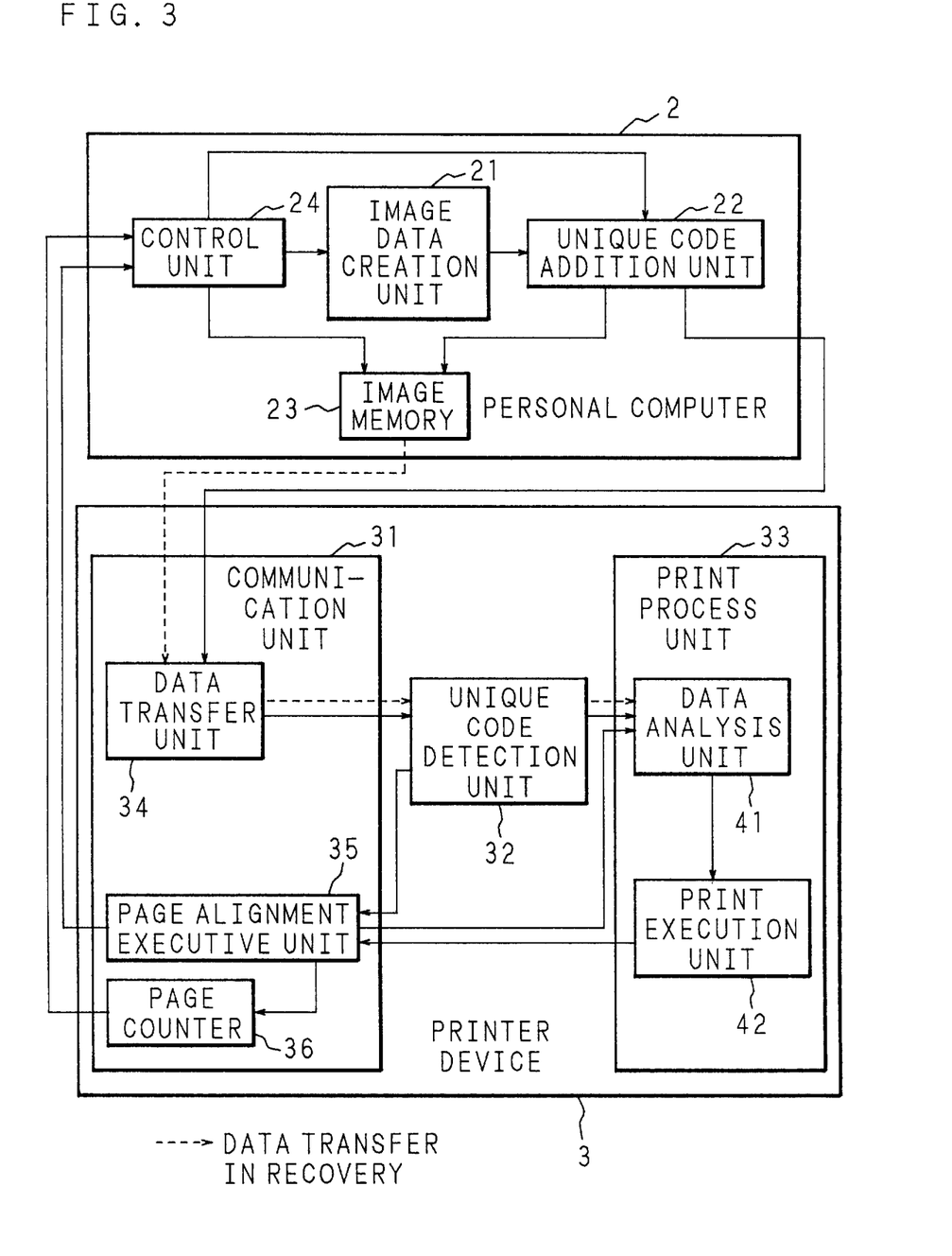
FIG. 3 is a block diagram showing the constitution of the first embodiment.

FIG. 3 is a block diagram showing the constitution of the first embodiment. In FIG. 3, the personal computer 2 as a data creation device comprises an image data creation unit 21 for creating the image data based on the user's input operation, a unique code addition unit 22 for recognizing the page alignment and adding the unique code, an image memory 23 for storing the image data to which the unique code is added, and a control unit 24 for controlling the operation of the respective piece of hardware and controlling the recovery functions on the data creative device side. In ordinary time, the data is sent from the unique code addition unit 22 to the printer device 3, and in the case where the recovery function is fulfilled, the data is sent from the image memory 23 to the printer device 3.

The printer device 3 connected with the personal computer 2 by LAN 1 comprises a communication unit 31 for transferring the data from the personal computer 2, a unique code detection unit 32 for detecting the unique code which is included in the transfer data, and a print process unit 33 for analyzing the transfer data and printing the image data. The communication unit 31 has a data transfer unit 34 for transferring the data from the personal computer 2 to the print process unit 33, a page alignment executive unit 35 for carrying out the page alignment based on the detection result of the unique code detection unit 32, and a page counter 36 which is counted up on each page alignment. The print process unit 33 has a data analysis unit 41 for analyzing the transmitted data, and a print execution unit 42 for carrying out printing according to the analysis result of the data analysis unit 41.

The data is transferred from the data transfer unit 34 to the print process unit 33 through the unique code detection unit 32. The unique code detection unit 32, when detecting the unique code from the transferred data, notify the page alignment executive unit 35 of the detection. The page alignment executive unit 35, on receipt of the notice, transfers the page alignment code to the print process unit 33. In the print process unit 33, the data analysis unit 41 analyzes the transmitted data, and the print executive unit 42 prints out the data according to the analysis result. And, when it has completed the printing of one page portion without trouble, the print executive unit 42 sends to the page alignment executive unit 35 a print end notice at the point of completion, or, in case of the failure in completion of printing due to paper jam or the like, a print no end notice is sent at the point of the recognition of the failure. The page alignment executive unit 35, on receipt of the print end notice, increases the count value of the page counter 36 and notify the control unit 24 of the personal computer 2 of the completion of printing, while on receipt of the print no end notice, notify the control unit 24 of the personal computer 2 of the non-completion of printing. The count value of the page counter 36 is also sent to the control unit 24.

Figure 4:
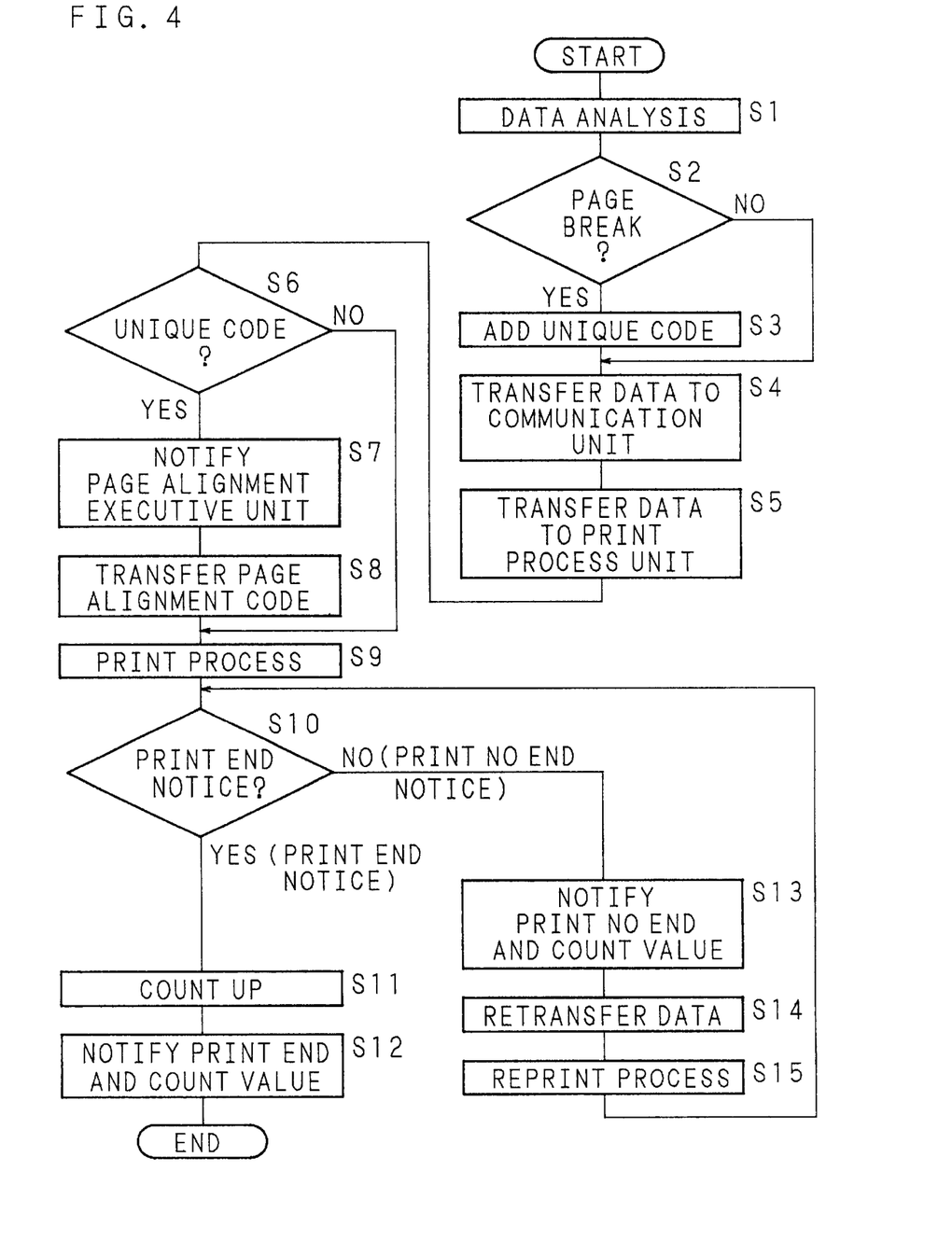
FIG. 4 is a flow chart showing the procedure for the operation of the first embodiment.

Next, the operation is explained. FIG. 4 is a flow chart showing the processing procedures of the first embodiment.

At first, the data prepared in the image data creative unit 21 is analyzed in the unique code addition unit 22 (Step S1) to judge whether the page break has been recognized or not (Step S2). When the page break having been recognized (S2: YES), a unique code formed by sequencing "ff" as shown in FIG. 2 by the predetermined number of bytes is added to the image data (Step S3). Next, the data is transferred to the communication unit 31 (data transfer unit 34) through the LAN 1 (Step S4).

In the printer device 3, the data is sent from the data transfer unit 34 to the print process unit 33 (data analysis unit 41) through the unique code detection unit 32 (Step S5). And, in the course of the transfer, judgment is made whether the unique code is detected or not by the unique code detection unit 32 (Step S6). The unique code detection unit 32 detects only presence or absence of the unique code without carrying out the image data analysis. That is to say, recognition of "ff" only is made, so that, when "ff" is recognized, the internal counter is counted up, while if no ff is detected, a processing to clear the counter is carried out, by which it is assumed that the unique code is detected at the time when the count value comes to the predetermined amount. In this manner, as it suffices to give attention to "ff" only, the unique code can be detected quite quickly.

In the case of detecting the unique code (S6: YES), the page alignment executive unit 35 is notified to the effect that the detection has been made (Step S7). In response to this notification, the page alignment code is transferred to the print process unit 33 (Step S8).

The data sent to the data analysis unit 41 is analyzed, and print process is carried out in the print executive unit 42 (Step S9). And, judgment is made as to whether the print end notice has been sent from the print process unit 33 (print executive unit 42) to the page alignment executive unit 35 or not (Step S10). In the case of the notice being sent, namely, when the printing has normally ended (S10: YES), the count value of the page counter 36 is increased by one (Step S11), and the end of printing is notified to the control unit 24 of the personal computer 2 from the page alignment executive unit 35, and the count value at that time is notified to the control unit 24 from the page counter 36 (Step S12). Consequently, it is possible to confirm on the side of the personal computer 2 which is a data creative device that the printing for one page has normally completed.

On the other hand, when the print end notice is not sent from the print process unit 33 (print execution unit 42) to the page alignment executive unit 35, in other words, when the trouble such as paper jam, out of paper, etc. has occurred and the print no end notice has been received without completing printing (S10: NO), the print no end is notified from the page alignment executive unit 35 to the control unit 24 of the personal computer 2, and the count value at that time is notified from the page counter 36 to the control unit 24 (Step S13). And, the control unit 24 reads out the data of the page corresponding to the count value from the image memory 23 and retransfer the data to the data transfer unit 34 (Step S14). The retransferred data is sent to the print process unit 33 through the unique code detection unit 32 and subjected to print process again (Step S15). In the above manner, the recovery function is executed.

(Second Embodiment)

In the first embodiment as described above, it is designed to perform a recovery function on the data creation device (personal computer 2) side. However, by providing the memory for storing the transfer data on the printer device 3 side, it is possible to fulfill the recovery function on the printer device 3 side. Such second embodiment is explained below.

Figure 5:
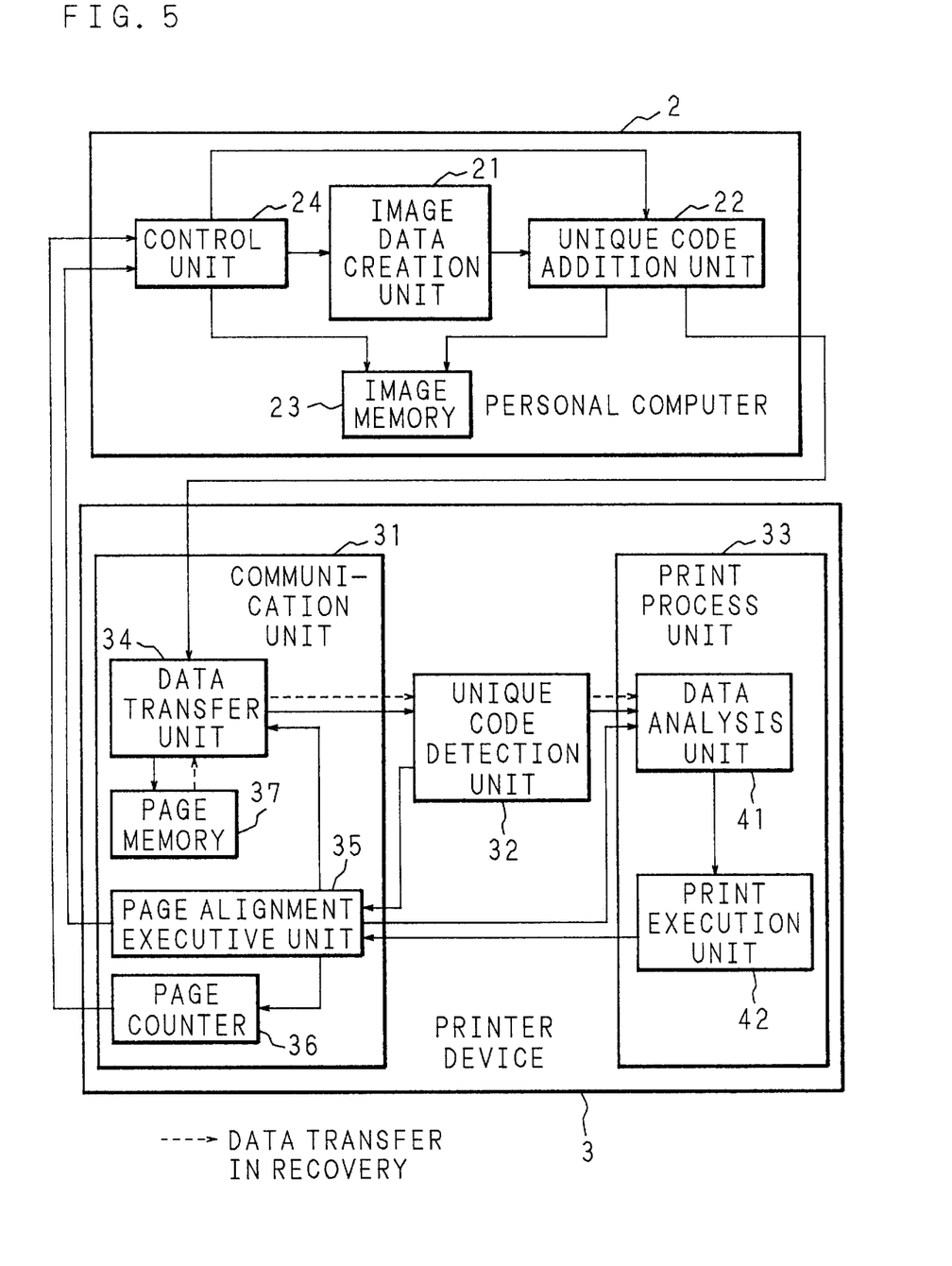
FIG. 5 is a block diagram showing the constitution of the second embodiment.

FIG. 5 is a block diagram showing the constitution of the second embodiment. The personal computer 2 as the data creation device comprises an image data creation unit 21, a unique code addition unit 22 and an image memory 23 similar to those of the first embodiment, and a control unit 24 for controlling the operation of these respective piece of hardware. In the same manner as in the first embodiment, when page break is recognized in the data made in the image data creation unit 21, a unique code is added to the image data by the unique code addition unit 22 and sent to the printer device 3.

The printer device 3 connected with the personal computer 2 by the LAN 1 comprises a communication unit 31, a unique code detection unit 32, and a print process unit 33, which are similar to those of the first embodiment. The communication unit 31 has a data transfer unit 34 for transferring the data from the personal computer 2 to the print process unit 33, a page alignment executive unit 35 for carrying out the page alignment based on the detection result of the unique code detection unit 32, a page counter 36 which is counted up on each page break, and a page memory 37 for storing the data of one page portion sent from the personal computer 2.

The data for one page portion sent from the personal computer 2 is written in the page memory 37 through the data transfer unit 34, and stored in the page memory 37 until the printing of said transmitted data is completed. In the normal time, the data is transferred from the data transfer unit 34 to the print process unit 33 through the unique code detection unit 32, and when the recovery function is executed, the data read out from the page memory 37 to the data transfer unit 34 is sent direct to the print process unit 33 through the unique code detection unit 32. The unique code detection unit 32, when detecting the unique code from the transferred data, notifies the page alignment executive unit 35 of the detection. The page alignment executive unit 35, on receipt of the notice, transfers the page alignment code to the print process unit 33. The print process unit 33 gives the print end notice when the printing for one page portion has been completed without trouble, or the print no end notice when the printing cannot be completed due to the cause such as paper jam, at the time of recognizing it, to the page alignment executive unit 35. The page alignment executive unit 35, on receipt of the print end notice, causes to increase the count value of the page counter 36, and notifies the control unit 24 of the personal computer 2 and the data transfer unit 34 of the print end, while on receipt of the print no end notice, notifies the data transfer unit 34 of the print no end. The data transfer unit 34, on receipt of the print end notice, erases the contents stored in the page memory 37, and on receipt of the print no end notice, reads out the contents stored in the page memory 37 and transfers them to the print process unit 33. The count value of the page counter 36 is sent to the control unit 24.

Figure 6A:
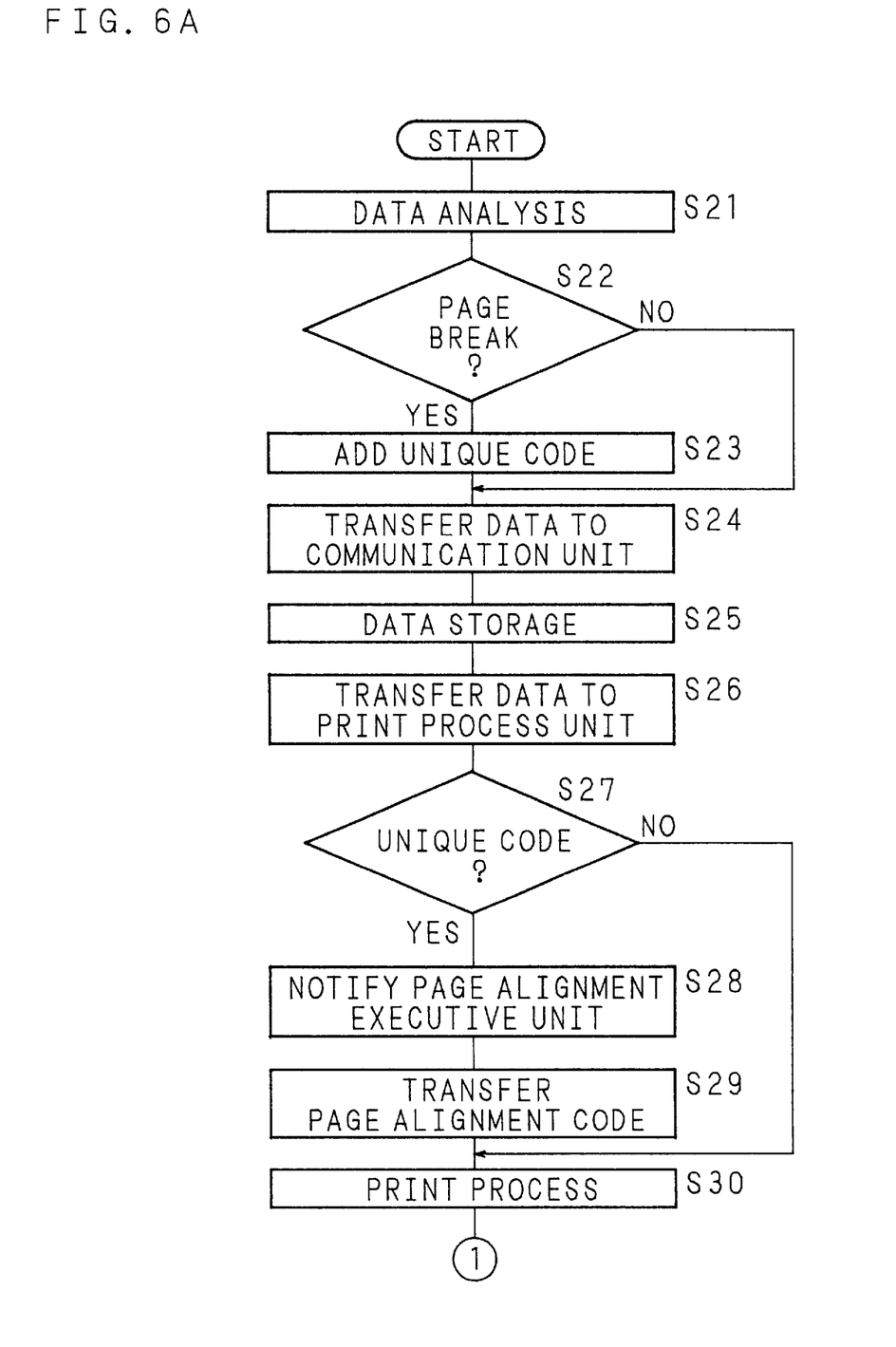
FIGS. 6A and 6B are flow charts showing the procedure for the operation of the second embodiment.
Figure 6B:
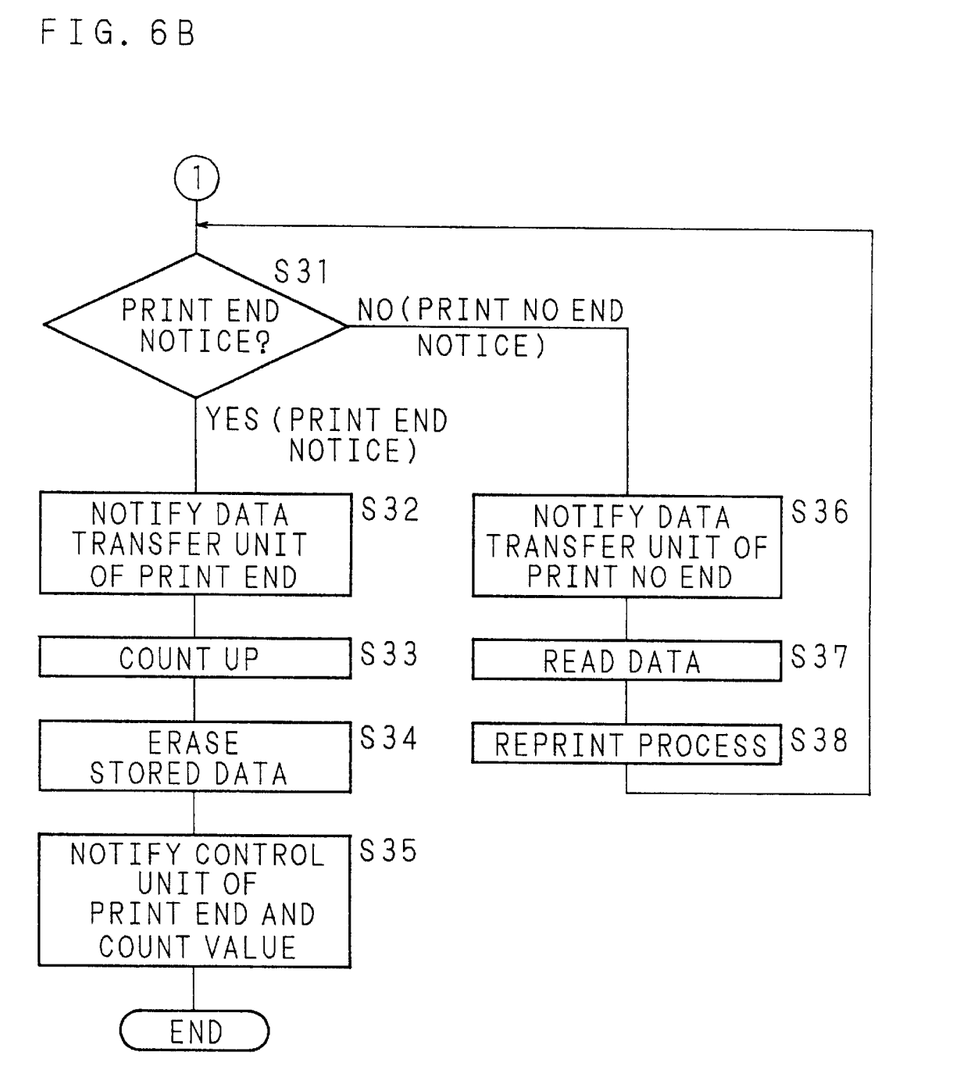

Next, the operation is explained. FIGS. 6A and 6B are flow charts showing the processing procedures of the second embodiment.

First, the data created in the image data creation unit 21 is analyzed in the unique code addition unit 22 (Step S21) to judge whether the page alignment has been recognized or not (Step S22). In the case of the recognition of the page break (S22: YES), a unique code made by sequencing the predetermined number of bytes of "ff" as shown in FIG. 2 are added to the image data (Step S23). Next, the data is transferred to the data communication unit 31 (data transfer unit 34) through the LAN 1 (Step S24).

The data transferred to the data transfer unit 34 is stored in the page memory 37 (Step S25). The transferred data is sent from the data transfer unit 34 to the print process unit 33 (data analysis unit 41) through the unique code detection unit 32 (Step S26). And, in the course of the transfer, judgment is made by the unique code detection unit 32 whether the unique code has been detected or not (Step S27). The unique code detection unit 32 detects the unique code by the process similar to that of the first embodiment. In case of the detection of the unique code (S27: YES), a report of detection is notified to the page alignment executive unit 35 (Step S28). According to this notice, the page alignment code is transferred to the print process unit 33 (Step S29).

The data sent to the data analysis unit 41 is analyzed and print process is carried out by the print execution unit 42 (Step S30). And, judgment is made as to whether the print end notice has been sent from the print process unit 33 (print execution unit 42) to the page alignment executive unit 35 or not (Step S31). When the notice has been sent, namely, in the case of the normal completion of the printing (S31: YES), print end is notified from the page alignment executive unit 35 to the data transfer unit 34 (Step S32), the count value of the page counter 36 is increased by one (Step S33), and the data stored in the page memory 37 is erased (Step S34). Besides, the print end is notified from the page alignment executive unit 35 to the control unit 24 of the personal computer 2, and the count value at that time is notified from the page counter 36 to the control unit 24 (Step S35).

Figure 7:
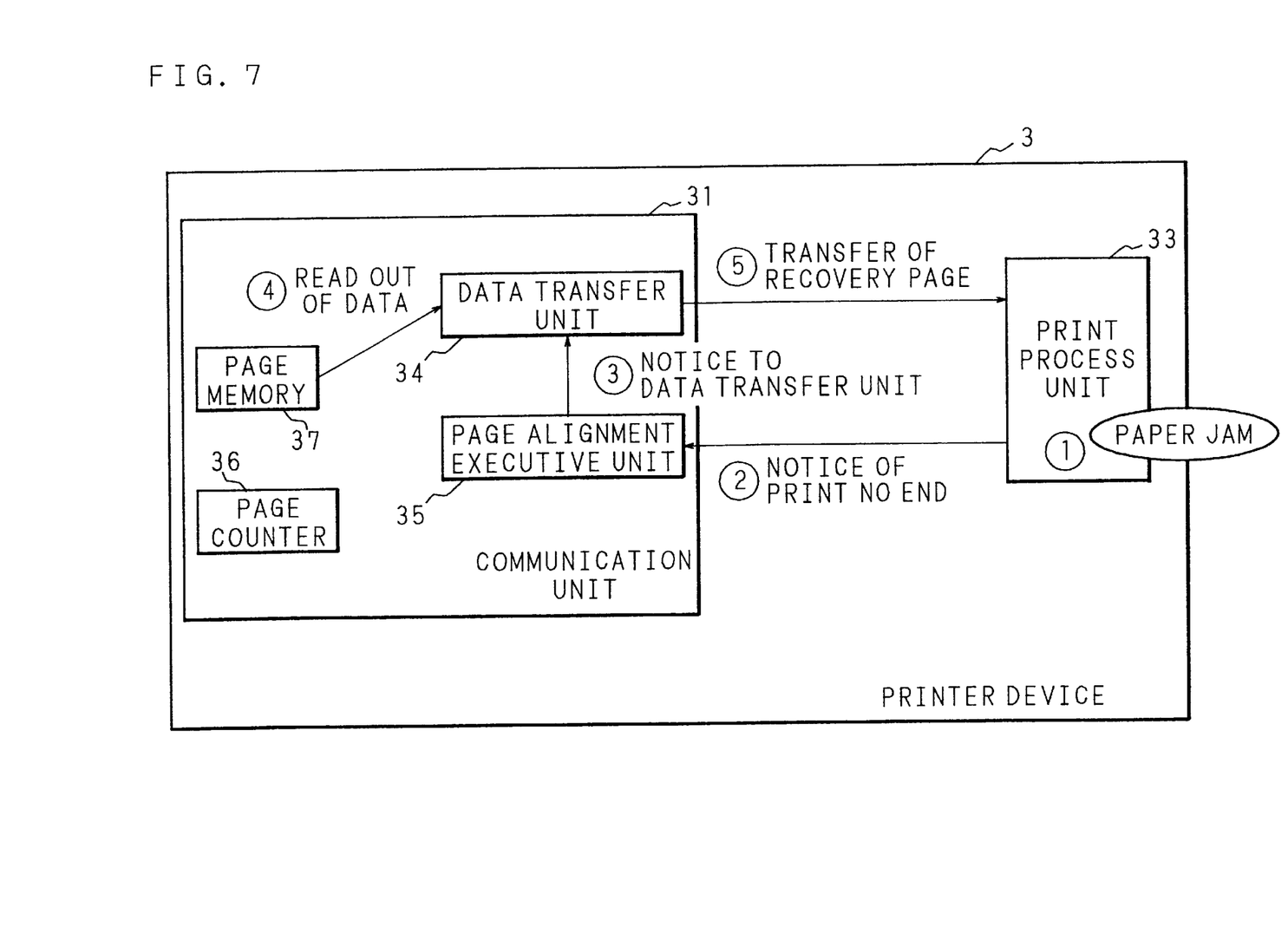
FIG. 7 is a view schematically showing the recovery function from occurrence of paper jam in the second embodiment.

On the other hand, when the print end notice has not been sent from the print process unit 33 (print execution unit 42) to the page alignment executive unit 35, i.e., in the case the trouble such as paper jam, out of paper, etc. occurred and a print no end notice has been sent without completion of printing (S31: NO), the recovery function is executed in the following manner. FIG. 7 is a view which schematically shows such recovery function accompanied with paper jam.

When paper jam occurs in the print process unit 33 (print execution unit 42) ((1)) and print no end notice is sent to the page alignment executive unit 35 ((2), S31: NO), the print no end is notified from the page alignment executive unit 35 to the data transfer unit 34 ((3), Step S36). In compliance with this notice, the data stored in the page memory 37 is read out to the transfer unit 34 ((4), Step S37). The read out data is sent to the print process unit 33 (data analysis unit 41) through the unique code detection unit 32 ((5)), and the printing process is performed again (Step S38).

In the first and second embodiments above, the data communication line is provided with a unique code detection unit 32 so as to have the page break recognized in the process of data communication, but it is also possible to constitute the apparatus so as to detect the unique code at the time of the actual image data analysis. Examples of such constitution are explained in the following third and fourth embodiments.

(Third Embodiment)

Figure 8:
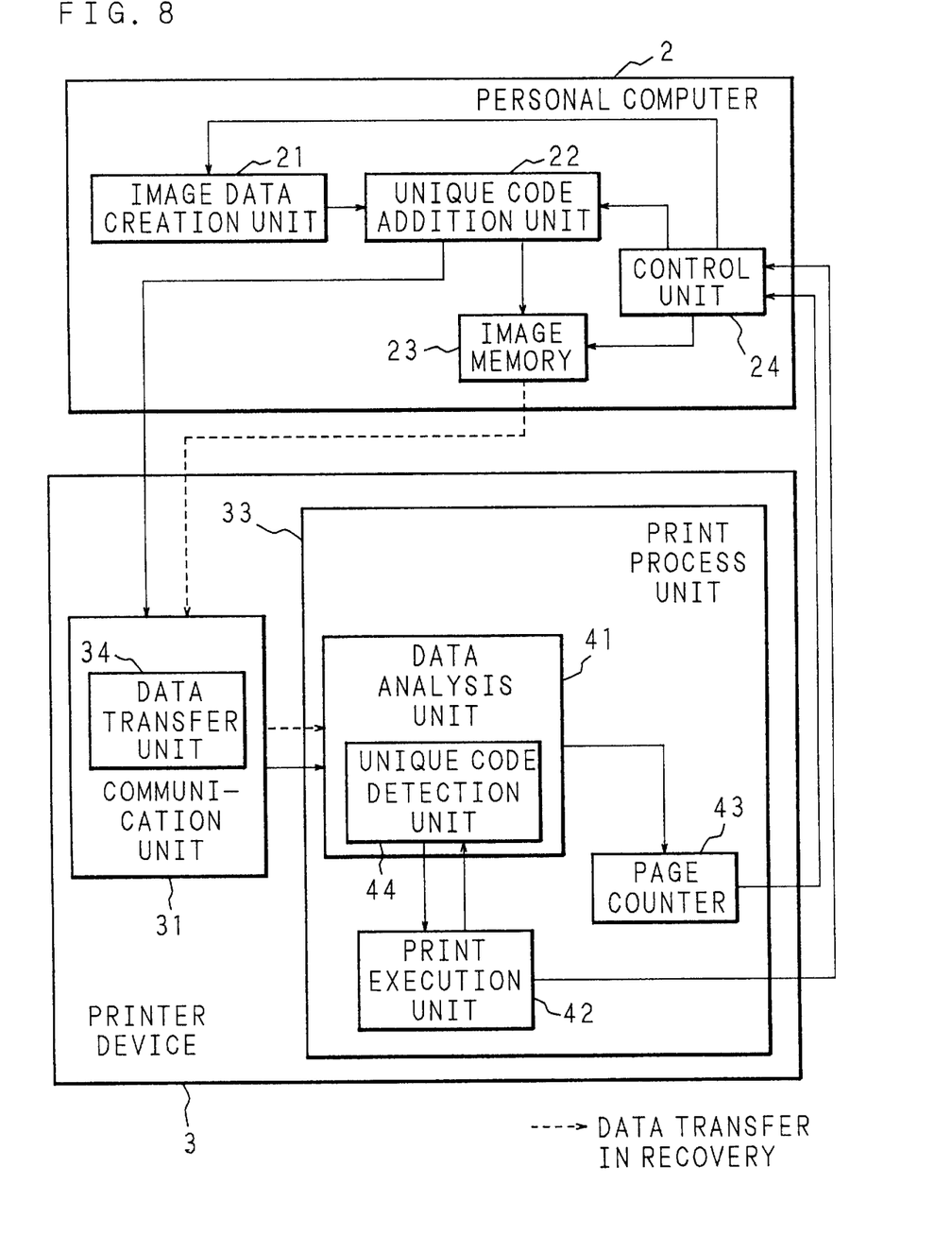
FIG. 8 is a block diagram showing the constitution of the third embodiment.

FIG. 8 is a block diagram showing the constitution of the third embodiment. In FIG. 8, the personal computer 2 as the data creation device comprises an image data creation unit 21, a unique code addition unit 22, an image memory 23 and a control unit 24 similar to those of the first embodiment. Ordinarily, the data is sent from the unique code addition unit 22 is sent to the printer device 3, and when recovery function is fulfilled, the data is sent to the printer device 3 from the image memory 23.

The printer device 3 connected with the personal computer 2 by LAN 1 comprises a communication unit 31 for transferring the data from the personal computer 2 and a print process unit 33 which is to carry out analysis of the transferred data and print the image data. The communication unit 31 has a data transfer unit 34 for transferring the data from the personal computer 2 to the print process unit 33. The print process unit 33 has a data analysis unit 41 for analyzing the transmitted data, a print execution unit 42 for carrying out printing according to the result of analysis by the data analysis unit 41, and a page counter 43 which is counted up at each end of the printing of the data for each page. The data analysis unit 41 includes a unique code detection unit 44 which detects the unique code contained in the transferred data independently from the data analysis.

The data from the personal computer 2 is transferred to the print process unit 33 (data analysis unit 41) through the communication unit 31 (data transfer unit 34). The unique code detection unit 44 detects the unique code from the transferred data, independently from the data analysis which is carried out in the data analysis unit 41. On detection of the unique code, the print execution unit 42 performs printing operation according to the analysis result in the data analysis unit 41. And, the print execution unit 42 transmits the print end notice at the end point when the printing process has ended without trouble, or the print no end notice when the printing cannot be ended due to the paper jam or the like, at the time of recognizing it, to the data analysis unit 41 and the control unit 24 of the personal computer 2, respectively. According to the timing in which the print end notice is transmitted to the data analysis unit 41, the page counter 43 is counted up. The count value of the page counter 43 is also sent to the control unit 24.

Figure 9:
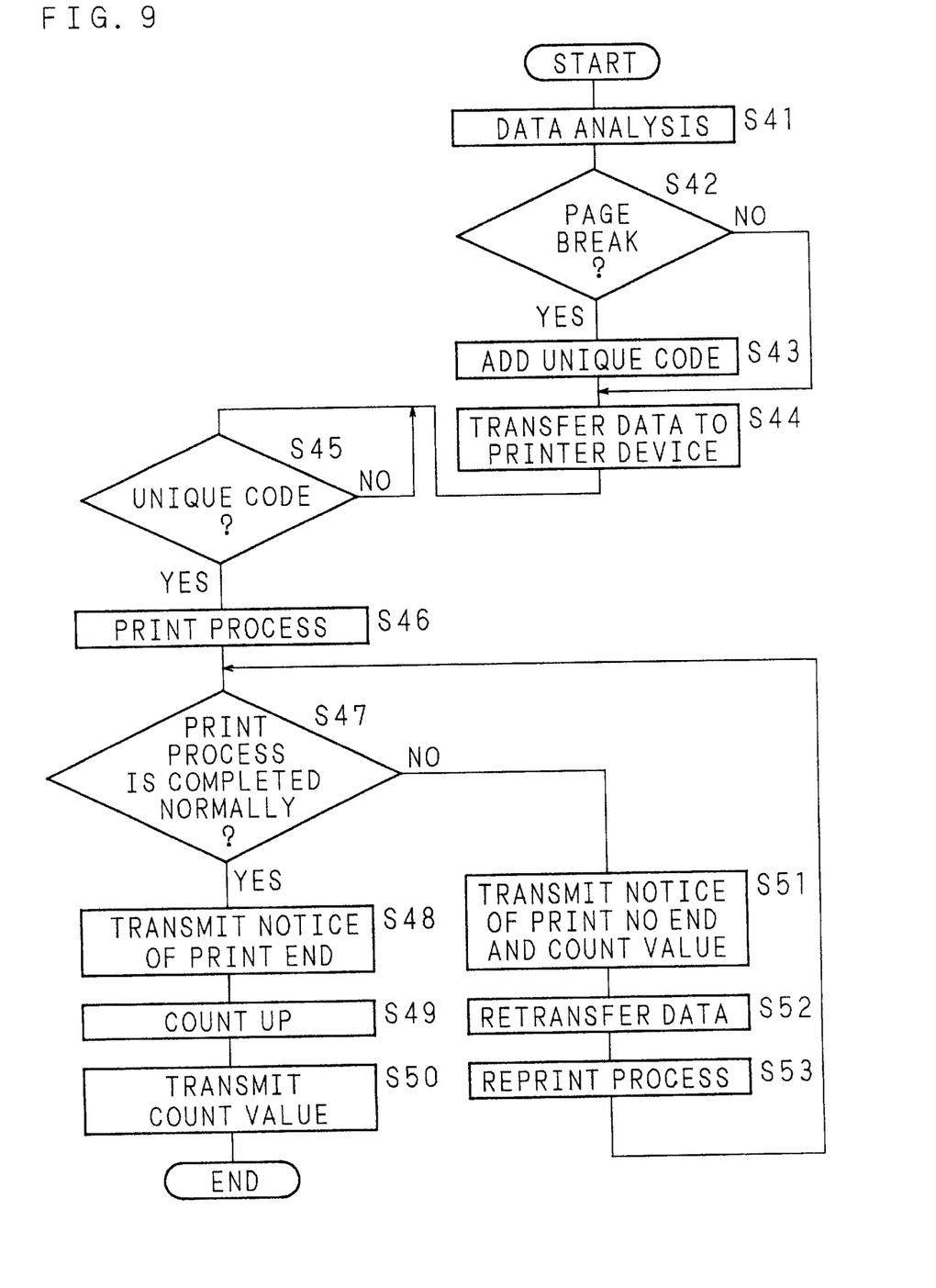
FIG. 9 is a flow chart showing the procedure for the operation of the third embodiment.

Next, the operation is explained. FIG. 9 is a flow chart showing the processing procedure of the third embodiment.

At first, the data created in the image data creation unit 21 is analyzed by the unique code addition unit 22 (Step S41) and judgment is made as to whether it has recognized the page alignment or not (Step S42). In the case of recognizing the page alignment (S42: YES), in the same manner as in the first embodiment, the unique code is added to the image data (Step S43). Next, the data is transferred to the print process unit 33 (data analysis unit 41) through the LAN 1 and communication unit 31 (data transfer unit 34) (Step S44).

And, in the unique code detection unit 44, independently from the image data analysis process, in the same procedure as that of the first embodiment, in the case of the detection of the unique code (Step S45: YES), according to the analysis result of the image data in the data analysis unit 41, the print process is carried out in the print execution unit 42 (Step S46).

Judgment is made as to whether the printing process in the print execution unit 42 has normally been completed or not (Step S47). In the case of the normal completion (S47: YES), the print end notice is transmitted to the data analysis unit 41 and control unit 24 (Step S48), the count value of the page counter 43 is counted up by one (Step S49), and the count value is sent to the control unit 24 (Step S50). Consequently, it can be confirmed on the personal computer 2 side which is a data creation unit that the printing for one page has normally completed.

On the other hand, when trouble such as paper jam or out of paper occurs and print is not ended (S47: NO), the print no end notice is transmitted to the data analysis unit 41 and the control unit 24, and the count value of the page counter 43 is sent to the control unit 24 (Step S51). And, the control unit 24 reads out the data on the page corresponding to the count value from the image memory 23. The read out data is sent again to the print process unit 33 (data analysis unit 41) through the data transfer unit 34 (Step S52). The analysis process to the resent data is carried out in the data analysis unit 41, and the print process is carried out again (Step S53). In the above manner, the recovery function is executed.

(Fourth Embodiment)

In the third embodiment given above, the recovery function is performed on the data creative unit (personal computer 2) side. However, by providing a memory for storing the transferred data on the side of the printer device 3, it becomes possible to perform a recovery function on the printer device 3 side. Such fourth embodiment is shown below.

Figure 10:
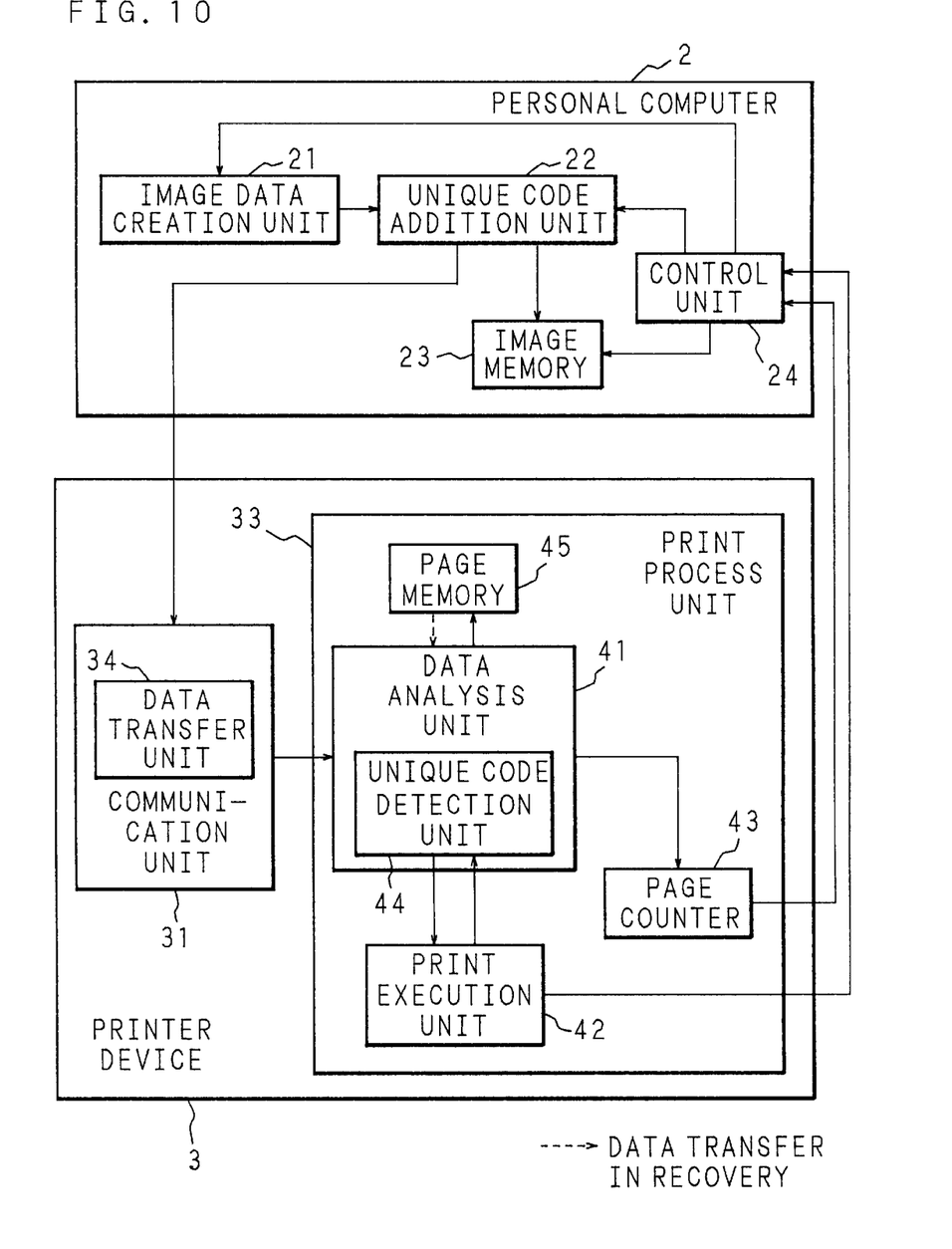
FIG. 10 is a block diagram showing the constitution of the fourth embodiment.

FIG. 10 is a block diagram showing the constitution of the fourth embodiment. The personal computer 2 as a data creative device comprises an image data creation unit 21, a unique code addition unit 22, an image memory 23 and a control unit 24 for controlling these hardware operations, similar to those of the third embodiment. In the same manner as in the third embodiment, when the page break has been recognized in the data created in the image data creative unit 21, a unique code is added to the image data by the unique code addition unit 22 and the image data is sent to the printer device 3.

The printer device 3 connected with the personal computer 2 by LAN 1 comprises a communication unit 31 and a print process unit 33 similar to those of the third embodiment. The print process unit 33 has a data analysis unit 41 for analyzing the transmitted data, a print execution unit 42 for carrying out printing according to the result of analysis by the data analysis unit 41, a page counter 43 which is counted up at each end of the printing of the data for each page, and a page memory 45 for storing the transmitted data for one page portion from the personal computer 2. The data analysis unit 41 includes a unique code detection unit 44 which detects the unique code contained in the transferred data independently from the data analysis.

The data for one page portion transmitted from the personal computer 2 (unique code addition unit 22) is written in the page memory 45 through the data transfer unit 34 and data analysis unit 41, and stored in the page memory 45 until the printing of the transmission data is over. Ordinarily, the data is transferred to the print process unit 33 (data analysis unit 41) from the personal computer 2 through the data transfer unit 34, and in the case of performing the recovery function, the data is read out from the page memory 45 to the data analysis unit 41. The unique code detection unit 44 detects the unique code from the transferred data, independently from the data analysis which is carried out in the data analysis unit 41. When the unique code is detected, the print execution unit 42 performs printing operation according to the result of analysis at the data analysis unit 41. And, when the print process has come to an end without trouble, at the point of the completion, the print execution unit 42 transmits the print end notice to the data analysis unit 41 and the control unit 24 of the personal computer 2. In the timing of the print end notice to be transmitted to the data analysis unit 41, the page counter 43 is counted up. The count value of the page counter 43 is also sent to the control unit 24. On the other hand, in the case of the failure in completion of the printing due to paper jam and the like, the print no end notice is transmitted to the data analysis unit 41 at the point of recognizing the failure. The data analysis unit 41, on receipt of the print no end notice, reads out the stored contents of the page memory 45 and again carries out the data analysis, and transfers the analysis results to the print execution unit 42. And, the print execution unit 42 performs the printing operation again.

Figure 11:
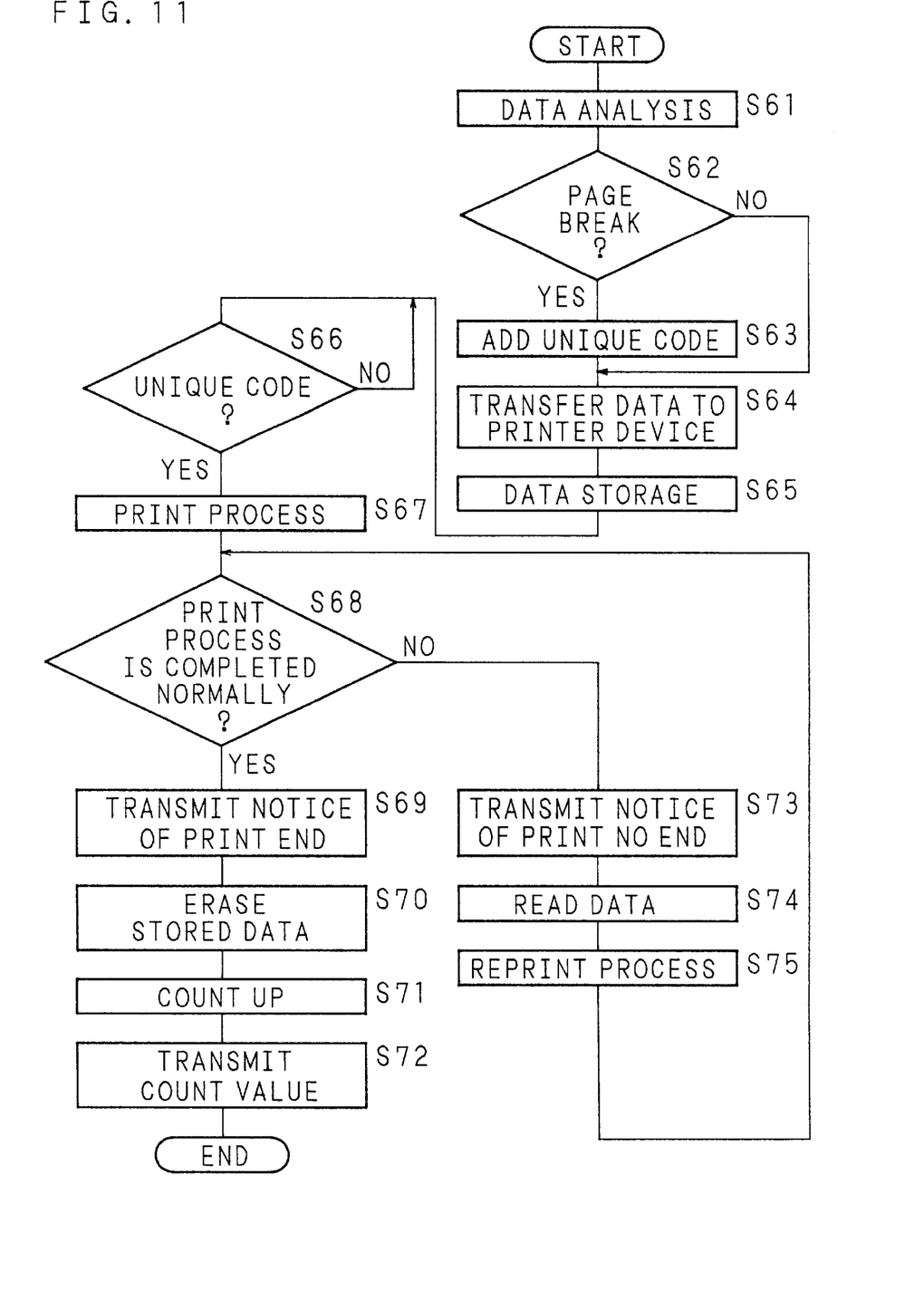
FIG. 11 is a flow chart showing the procedure for the operation of the fourth embodiment.

Next, the operation is explained. FIG. 11 is a flow chart showing the processing procedure of the fourth embodiment.

At first, the data created in the image data creative unit 21 is analyzed in the unique code addition unit 22 (Step S61)

and judgment is made as to whether the page alignment has been recognized or not (Step S62). In the case of the recognition of the page break (S62: YES), in the same manner as in the first embodiment, the unique code is added to the image data (Step S63). Next, the data is transferred to the print process unit 33 (data analysis unit 41) through the LAN 1 and the communication unit 31 (data transfer unit 34) (Step S64).

The data transferred to the data analysis unit 41 is stored in the page memory 45 (Step S65). And, in the unique code detection unit 44, independently from the image data analysis process, in the same procedure as the first embodiment, when the unique code is detected (Step S66: YES), according to the analysis result of the image data in the data analysis unit 41, the print process is executed in the print execution unit 42 (Step S67).

Judgment is made as to whether the print process in the print execution unit 42 is normally ended or not (Step S68). In the case of a normal end (S68: YES), the print end notice is transmitted to the data analysis unit 41 and control unit 24 (Step S69), the data stored in the page memory 45 is canceled (Step S70), and further, the count value of the page counter 43 is increased by one (Step S71), and the count value is sent to the control unit 24 (Step S72). Consequently, it can be confirmed on the personal computer 2 side which is a data creative device that the printing of one page portion has normally been completed.

On the contrary, when the printing is not completed due to the occurrence of trouble such as paper jam, out of paper, etc. (S68: NO), a print no end notice is transmitted to the data analysis unit 41 (Step S73). And, the data stored in the page memory 45 is read out to the data analysis unit 41 (Step S74). The read out data is analyzed by the data analysis unit 41, and the analysis result is sent to the print execution unit 42 and print processing is executed again (Step S75). In the manner as described above, the recovery function is executed on the printer 3 side.

As described above, according to the present invention, without necessitating the data analysis as in the conventional system, the unique code to show the page break can be detected, and as the data analysis is unnecessary, the page break can be recognized in a short time in comparison with the conventional system, thus contributing to improvement of the printer performance. Moreover, since the page alignment process and recovery process are performed on the basis of the unique code detection, there are effects that these processes can be made quickly.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A page alignment indication method in a printer system for transferring data to a printer device from a data creation device and printing the transferred data, comprising the steps of:

creating transfer data to be transferred from the data creation device to the printer device; and inserting a page alignment code formed by connecting a predetermined number or more of identical data of one or more bytes of the kind that can never occur in a printer system; in the transfer data.

2. A page control method in a printer system for transferring data to a printer device from a data creation device and printing the transferred data, comprising the steps of:

inserting a page alignment code formed by connecting a predetermined number or more of identical data of one or more bytes of the kind that can never occur in a printer system, in data to be transferred from the data creation device to the printer device;

detecting the inserted page alignment code; and performing a page control based on the detected page alignment code.

3. A printer system for transferring data created by a data creation device to a printer device to print, comprising:

a data creation device for creating data; and a printer device which is to receive the data created by said data creation device and print the transferred data, wherein said data creation device comprises means for inserting a code to show the page alignment in the created data, and said printer device comprises detection means for detecting the code independently from the analysis process of the created data.

4. The printer system according to claim 3, wherein said printer device further comprises a counter which is counted up on each detection of the code by said detection means.

5. The printer system according to claim 4, wherein said printer device further comprises means for sending the count value of said counter to said data creation device.

6. The printer system according to claim 3, wherein said printer device further comprises judgement means for judging whether or not the print process has ended for each page and a counter which is counted up each time said judgement means judges that the print process has ended.

7. The printer system according to claim 6, wherein said printer device further comprises means for sending the count value of said counter to said data creation device.

8. The printer system according to claim 3, wherein said printer device further comprises storage means for storing the data for each page transferred from said data creation device, judgment means for judging whether or not the print process has ended for each page, means for erasing the data stored in said storage means when said judgment means judges that the print process has ended, and means for reading out the data stored in said storage means when said judgment means judges that the print process has not ended.

9. The printer system according to claim 3, wherein said printer device further comprises a counter which is counted up on each detection of the code by said detection means, judgment means for judging whether or not the print process has ended for each page, and means for sending a no end notice and the count value of said counter to said data creation device when said judgement means judges that the print process has not ended, and said data creation device further comprises means for re-sending the data on the page corresponding to the count value to said printer device in case of receiving the no end notice.

10. The printer system according to claim 3, wherein said printer device further comprises judgment means for judging whether or not the print process has ended for each page, a counter which is counted up each time when said judgement means judges that the print process has ended, and means for sending a no end notice and the count value of said counter to said data creation device when said judgement means judges that the print process has not ended, and said data creation device further comprises means for re-sending the data of the page corresponding to the count value to said printer device in the case of receiving the no end notice.

11. The printer system according to claim 3, wherein the code to show the page alignment is constituted by a sequence of a predetermined number or more of identical data of one or more bytes.

12. A printer device for printing data transferred from a data creation device, comprising:
- means for analyzing the data created by said data creation device; and
- detection means for detecting, independently from the analysis process of the created data, a code to show the page alignment inserted in the created data.

13. The printer device according to claim 12, further comprising:
- a counter which is counted up on each detection of the code by said detection means.

14. The printer device according to claim 13, further comprising:
- means for sending the count value of said counter to said data creation device.

15. The printer device according to claim 12, further comprising:
- judgment means for judging whether or not the print process has ended for each page; and
- a counter which is counted up each time when said judgement means judges that the print process has ended.

16. The printer device according to claim 15, further comprising:
- means for sending the count value of said counter to said data creation device.

17. The printer device according to claim 12, further comprising:
- storage means for storing the data for each page transferred from said data creation device;
- judgment means for judging whether or not the print process has ended for each page;
- means for erasing the data stored in said storage means when said judgment means judges that the print process has ended; and
- means for reading out the data stored in said storage means when said judgment means judges that the print process has not ended.

18. The printer device according to claim 12, wherein the code to show the page alignment is constituted by a sequence of a predetermined number or more of identical data of one or more bytes.

* * * * *